United States Patent [19]

Träubel et al.

[11] Patent Number: 6,143,132
[45] Date of Patent: Nov. 7, 2000

[54] PROCESS FOR IMPARTING WET STRENGTH TO PAPER

[75] Inventors: Harro Träubel, Leverkusen; Hans-Josef Laas, Cologne; Helmut Reiff, Leverkusen; Joachim König, Odenthal; Jürgen Reiners, Leverkusen; Harald Faika, Krefeld, all of Germany

[73] Assignee: Bayer Aktiengesellschaft, Leverkusen, Germany

[21] Appl. No.: 09/212,615

[22] Filed: Dec. 16, 1998

Related U.S. Application Data

[63] Continuation of application No. 08/041,731, Apr. 1, 1993, abandoned.

[30] Foreign Application Priority Data

Apr. 6, 1992 [DE] Germany ............... 42 11 480

[51] Int. Cl.⁷ ............................ D21H 21/18
[52] U.S. Cl. ............... 162/158; 162/135; 162/164.6
[58] Field of Search ............... 162/158, 135, 162/164.3, 164.6

[56] References Cited

U.S. PATENT DOCUMENTS

| | | | |
|---|---|---|---|
| 2,926,116 | 2/1960 | Keim | 162/164 |
| 3,049,469 | 8/1962 | Davidson | 162/164 |
| 3,238,010 | 3/1966 | Habib et al. | 162/157.6 |
| 3,311,608 | 3/1967 | Murphy | 162/157.6 |
| 3,332,901 | 7/1967 | Keim | 260/29.2 |
| 3,483,077 | 12/1969 | Aldrich | 162/158 |
| 3,589,978 | 6/1971 | Kamal et al. | 162/158 |
| 3,748,329 | 7/1973 | Liebsch et al. | 260/244 |
| 3,752,700 | 8/1973 | Dahl | 117/155 |
| 3,761,307 | 9/1973 | Dahl | 117/122 |
| 3,802,988 | 4/1974 | Dahl | 156/331 |
| 3,925,283 | 12/1975 | Dahl | 260/24 |
| 3,996,154 | 12/1976 | Johnson et al. | 252/312 |
| 4,505,778 | 3/1985 | Robertson | 162/164.6 |
| 4,547,265 | 10/1985 | Forgione et al. | 162/164.6 |
| 4,663,377 | 5/1987 | Hombach et al. | 524/196 |
| 4,670,100 | 6/1987 | Henning et al. | 162/135 |
| 4,892,620 | 1/1990 | Beuzelin et al. | 162/164.6 |

FOREIGN PATENT DOCUMENTS

| | | | |
|---|---|---|---|
| 0013112 | 7/1980 | European Pat. Off. | C07C 119/042 |
| 0017598 | 10/1980 | European Pat. Off. | D21H 3/48 |
| 0061628 | 10/1982 | European Pat. Off. | C09J 3/00 |
| 0140537 | 5/1985 | European Pat. Off. | D21H 3/02 |
| 0206059 | 12/1986 | European Pat. Off. | C08G 18/72 |
| 0336205 | 10/1989 | European Pat. Off. | C08G 18/42 |
| 0339396 | 11/1989 | European Pat. Off. | C08G 18/79 |
| 1177824 | 9/1958 | Germany . | |
| 1670666 | 7/1971 | Germany | C07D 273/04 |
| 2264699 | 8/1974 | Germany | D21H 3/48 |
| 2703271 | 8/1978 | Germany | C08L 75/02 |
| 31102038 | 12/1981 | Germany | D21H 3/48 |
| 3700209 | 7/1988 | Germany | C07C 127/24 |
| 3900053 | 7/1990 | Germany | C07D 229/00 |
| 4001783 | 7/1991 | Germany | C08G 18/72 |
| 2018796 | 10/1979 | United Kingdom | C07C 119/048 |
| 2068034 | 8/1981 | United Kingdom | D21H 3/60 |

OTHER PUBLICATIONS

Ullmanns Encyklopadie der technischen Chemie (Ulmann's Encyclopaedia of Chemical Technology), Weinheim, vol. 17 (1979) pp. 585–587.

R. Pelzer et al., Wochenblatt fur Papierfabrikation Weekly Journal for Paper Manufacture, 11/12 (1989) pp. 499, 500, 502, 504.

Methoden der organischen Chemie (Methods of Organic Chemistry), Houben–Weyl, vol. XIV/1, part 1, pp. 190–208.

Chemical Abstracts, vol. 94 (1981) JP–A–86035r.

Chemical Abstracts, Polymer Chemistry, p. 5, JA–57 149.

*Primary Examiner*—Peter Chin
*Attorney, Agent, or Firm*—Norris, McLauglin & Marcus, P.A.

[57] ABSTRACT

The novel AOX-free process for imparting wet strength to paper with water-dispersible polyisocyanates is distinguished by a good wet-strength effect, even under mild drying conditions, and does not affect the activity of optical brighteners used at the same time.

4 Claims, No Drawings

PROCESS FOR IMPARTING WET STRENGTH TO PAPER

BACKGROUND OF THE INVENTION

This application is a continuation of Application Ser. No. 08/041,731 filed Apr. 1, 1993, now abandoned.

It has been known for a long time to use reaction products of polyamidoamines and/or polyamines with epichlorohydrin for improving the wet strength of paper.

However, these known wet-strength agents contain a certain amount of organically bonded chlorine.

The organic chlorine content is made up partly of chlorohydrin groups and partly of chlorine originating from low-molecular secondary components formed from epichlorohydrin during the synthesis.

For application as a wet-strength agent, an aqueous solution of the polycondensation product is added to a pulp slurry, from which the sheet of paper is formed by dewatering. A certain proportion of organic halogen compounds thereby passes into the effluent from paper manufacture, where it can be determined as the so-called AOX value (DIN 38 409 part 14).

It is known that the tensile strength (dry and wet) of paper, cardboard etc. can be improved by the addition of a basic polyurethane (cf. German patent application A-3 102 038).

Processes for imparting wet strength to paper are also known in which prepolymers derived from polyisocyanates having NCO groups of different reactivity (e.g. from TDI) are applied to the dry paper from solution in the presence of catalysts (cf. e.g. U.S. Pat. No. 3,702,781).

Aqueous dispersions of isocyanate prepolymers in which the isocyanate groups are blocked have also been proposed for the impregnation of paper in order to increase its dry and wet strength (cf. European patent application A-17 598).

The impregnation of paper, for the purpose of imparting wet and dry strength, with mixtures of polyalcohol, isocyanate and polyamine, which are capable of curing in the paper, has also been described (cf. German patent application A-2 264 699).

Used in the stock, cationic polymers containing isocyanate and primary amine groups, which can be obtained by the Hoffmann degradation of copolymers of (meth)acrylamide etc., are also suitable, after heat treatment, for strengthening paper (cf. Japanese patent specification 57 149).

Thus, on the one hand, the state of the art is the treatment of paper with capped isocyanates or other reactive mixtures which are capable of being converted to polyurethane in the substrate; on the other hand, melamine/formaldehyde or urea/formaldehyde condensation products, or polyamidoamine/epichlorohydrin resins, are used for this purpose (Ullmanns Encyklopädie der technischen Chemie (Ullmann's Encyclopaedia of Chemical Technology), Weinheim, vol. 17, 1979, page 585).

Conventionally synthesised wet-strength agents are often quaternised polyamides, polyimides etc. The cationic structure of these products is supposed to be responsible for their absorption by the cellulose fibres (R. Pelzer et al., Wochenblatt für Papierfabrikation Weekly Journal for Paper Manufacture, 11/12 (1918) p. 499).

However, these processes, known from the state of the art, for imparting wet or dry strength to paper are not satisfactory in all requirements, in particular with regard to the organic halogen content (OX content) of the products employed and the resulting AOX (=absorbed organic halogen) pollution of effluents from paper mills.

The problem therefore existed of providing a new process for imparting wet strength to paper and paper-like materials, in which a halogen-free wet-strength agent based on water-dispersible polyisocyanates is used which has the same wet-strength effect as conventional wet-strength agents based on polyamidoamine/epichlorohydrin resin in stock and surface treatment over a wide pH range and also increases dry strength.

It has now surprisingly been found that water-dispersible polyisocyanates are excellently suitable as dry- and wet-strength agents for paper. They can be added prior to sheet formation (stock application), i.e. as additives to the fibre stock suspension, or to the paper surface, i.e. by being applied to a formed sheet of paper.

The present invention thus relates to a process for the production of paper and paper-like materials having dry and wet strength, characterised in that the paper or paper-like material or the pulp used for the production of the paper or the paper-like material is treated with water-dispersible polyisocyanates.

Mixtures of non-autodispersible polyisocyanates with external, ionic or non-ionic emulsifiers can also be used as water-dispersible polyisocyanates.

However, a preferred embodiment of the process according to the invention uses autodispersible polyisocyanates such as, for example:

(I) water-dispersible non-ionic polyisocyanate mixtures of polyisocyanates and polyisocyanates modified by polyethers and containing cycloaliphatically and/or aliphatically bonded isocyanate groups, (II) polyisocyanate mixtures of polyisocyanates and polyisocyanates modified by carboxylate groups and containing cycloaliphatically and/or aliphatically bonded isocyanate groups, or (III) water-dispersible non-ionic polyisocyanates containing aromatically bonded isocyanate groups, or mixtures of such polyisocyanates.

It is preferable to use water-dispersible polyisocyanate mixtures (I) with a) a mean NCO functionality of 1.8 to 4.2, b) a content of aliphatically and/or cycloaliphatically bonded isocyanate groups (calculated as NCO, molecular weight=42) of 12.0 to 21.5% by weight, based on the polyisocyanate mixture (I), and c) a content of ethylene oxide units situated within polyether chains (calculated as $C_2H_4O$, molecular weight=44) of 2 to 20% by weight, based on the polyisocyanate mixture (I), the polyether chains having a statistical mean of 5 to 70 ethylene oxide units.

The water-dispersible polyisocyanate mixtures (I) can be prepared in a manner known per se by reacting a polyisocyanate component A) with a (mean) NCO functionality of 2.1 to 4.4, preferably 2.3 to 4.3, consisting of at least one polyisocyanate containing exclusively aliphatically and/or cycloaliphatically bonded isocyanate groups, with a monohydric or polyhydric polyalkylene oxide polyether-alcohol B) having a statistical mean of 5.0 to 70 ethylene oxide units, while maintaining an NCO/OH equivalent ratio of at least 2:1, generally of 4:1 to approx. 1000:1, the type and proportions of said starting components moreover being chosen so that the resulting reaction products satisfy the conditions mentioned above under a) to c).

The polyisocyanate components A) may have a uretdione and/or isocyanurate, urethane and/or allophanate, biuret or oxadiazine structure, such as those described for example in German patent application A-1 670 666, German patent application A-3 700 209 and German patent application A-3 900 053 or in European patent application A-336 205 and European patent application A-339 396, which can be prepared by modifying simple aliphatic and/or cycloaliphatic diisocyanates.

In principle, suitable diisocyanates for the preparation of such polyisocyanate components A) are those whose molecular weight is in the range from 140 to 400 and which contain aliphatically and/or cycloaliphatically bonded isocyanate groups, such as e.g. 1,4-diisocyanatobutane, 1,6-diisocyanatohexane, 1,5-diisocyanato-2,2-dimethylpentane, 2,2,4- or 2,4,4-trimethyl-1,6 -diisocyanatohexane, 1,10-diisocyanatodecane, 1,3- and 1,4-diisocyanatocyclohexane, 1-isocyanato-3,3,5-trimethyl-5-isocyanatomethylcyclohexane (isophorone diisocyanate) and 4,4'-diisocyanatodicyclohexylmethane or any desired mixtures of such diisocyanates. In general, it would also be possible to use aromatic isocyanates such as e.g. toluylene diisocyanate and 4,4'-diisocyanato-diphenylmethane; because the latter lack light fastness and are excessively reactive towards water, however, the aliphatic isocyanates are preferred, although mixed trimers of aliphatic and aromatic diisocyanates have a certain interest.

The starting components A) used for the preparation of the water-dispersible polyisocyanate mixtures are preferably polyisocyanate mixtures with an NCO content of 19 to 24% by weight, based on component A), which have isocyanurate groups consisting essentially of trimeric 1,6-diisocyanatohexane and/or dimeric 1,6-diisocyanatohexane, and/or uretdione and/or biuret groups. The corresponding polyisocyanates with said NCO content which are substantially free of uretdione groups and have isocyanurate or biuret groups, such as those obtained by the catalytic trimerisation, known per se, of 1,6-diisocyanatohexane and preferably having a (mean) NCO functionality of 2.2 to 4.2, are particularly preferably used as component A). Instead of the trimers, it is also possible to use biurets (obtained in known manner by specific reaction with water) or oligourethanes such as those formed e.g. by reacting the diisocyanates with trimethylolpropane, pentaerythritol or sorbitol.

The component B) consists of monohydric or polyhydric polyalkylene oxide polyether-alcohols having a statistical mean of 5 to 70, preferably 6 to 60 ethylene oxide units per molecule, such as those obtainable in a manner known per se by the alkoxylation of suitable starter molecules.

Any desired monohydric or polyhydric alcohols whose molecular weight is in the range from 32 to 150, such as those also used, for example, according to European patent application A-206 059, can be used as starter molecules for the preparation of the polyether-alcohols B). Monofunctional aliphatic alcohols having 1 to 4 carbon atoms are preferably used as starter molecules. It is particularly preferable to use methanol.

Alkylene oxides suitable for the alkoxylation reaction are especially ethylene oxide and propylene oxide, which can be used in the alkoxylation reaction in any desired order or else in a mixture.

The polyalkylene oxide polyether-alcohols B) are either pure polyethylene oxide polyethers or mixed polyalkylene oxide polyethers containing in each case at least one polyether chain which has at least 5, generally 5 to 70, preferably 6 to 60 and particularly preferably 7 to 20 ethylene oxide units and in which at least 60 mol %, preferably at least 70 mol % of the alkylene oxide units consist of ethylene oxide units.

Preferred polyether-alcohols B) for the preparation of the water-dispersible polyisocyanate mixtures (I) are monofunctional polyalkylene oxide polyethers which have been started on an aliphatic alcohol having 1 to 4 carbon atoms and which contain a statistical mean of 6 to 60 ethylene oxide units. Particularly preferred polyether-alcohols B) are pure polyethylene glycol monomethyl ether-alcohols having a statistical mean of 7 to 20 ethylene oxide units.

The polyisocyanate mixtures (II) which are preferably used are polyisocyanate mixtures containing carboxyl groups, such as those described in German patent application A-4 001 783, which can readily be dispersed in water after at least partial neutralisation of the carboxyl groups.

As water-dispersible non-ionic polyisocyanates containing aromatically bonded isocyanate groups (III), it is preferable to use those described e.g. in British patent application A-1 444 933 and British patent application A-2 018 796, European patent application A-61 628 or German patent application A-2 703 271. Said substances can be used in any desired mixture with one another.

As non-autodispersible polyisocyanates, it is preferable to use polyisocyanate components A) in a mixture with external ionic or non-ionic emulsifiers. Such emulsifiers are described for example in Methoden der organischen Chemie (Methods of Organic Chemistry), Houben-Weyl, vol. XIV/1, part 1, pages 190–208, Georg-Thieme-Verlag, Stuttgart 1961, or in U.S. Pat. No. 3,428,592 or European patent application A-13 112. The emulsifiers are used in an amount which ensures dispersibility.

To facilitate incorporation into the aqueous phase, the water-dispersible polyisocyanates used in the process according to the invention can optionally be used dissolved in a solvent inert towards isocyanate groups. Examples of suitable solvents are ethyl acetate, butyl acetate, ethylene glycol monomethyl or monoethyl ether-acetate, 1-methoxyprop-2-yl acetate, butan-2-one, 4-methylpentan-2-one, cyclohexanone, toluene or mixtures thereof, or else solvents such as propylene glycol diacetate, diethylene glycol dimethyl ether, diethylene glycol ethyl and butyl ether-acetate, N-methylpyrrolidone and N-methylcaprolactam, or mixtures of such solvents. These solvents are optionally added to the water-dispersible polyisocyanates in amounts of up to 90% by weight, preferably at most 50% by weight and particularly preferably at most 20% by weight, based on the solution formed. However, it is very particularly preferable to use solvent-free water-dispersible polyisocyanates.

In the process according to the invention, the water-dispersible polyisocyanates are used in amounts of 0.005 to 50% by weight, preferably 0.1 to 10% by weight, based on the paper stock; they are preferably used in the stock, i.e. they are added directly to the wood fibre/cellulose fibre dispersion. Before the polyisocyanates are used, especially when added to the paper pulp, they can be predispersed with 1–4 times the amount of water, based on polyisocyanate. The use of the component (I) thereby permits processing times of up to 24 hours. When water-dispersible aromatic polyisocyanates (III) are used, the processing times are markedly shorter, because of the higher reactivity towards water, and are generally up to 8 hours.

The water-dispersible polyisocyanates to be used according to the invention can be employed at the processing temperatures conventionally used in the paper industry, whereby the processing times for the products to be used according to the invention can vary according to temperature. Thus, for example, the processing times for the polyisocyanate of Example A) at 23–25° C. are relatively long since approx. 60% of isocyanate groups are still present after 5 hours at this temperature. With polyisocyanate A), approx. 50% of isocyanate groups are still present after 5 hours at a temperature of 35° C. and 33% are still present after 3 hours at 50° C. Thus the processing time at a particular temperature can be influenced by choosing a suitable polyisocyanate to be used according to the invention.

The water-dispersible polyisocyanates to be used according to the invention are suitable both for surface treatment and for stock addition. The products to be used according to the invention can also be employed in the sizing press, making it possible to manufacture papers resistant to water, oil and benzine.

The pH of the cellulose stock or the paper should preferably be between 5 and 8.5, especially in the region of neutrality, when the products to be used according to the invention are added. pH values below 4 or above 9 should be avoided.

The products to be used according to the invention make it possible to impart wet strength to paper without polluting the effluent with organic halogen compounds (determined as the AOX value according to DIN 38 409 part 14). As can be seen from the Examples, it is also possible to improve the wet tear strength, even under mild drying conditions, directly in the machine, i.e. the customary appreciable condensation or maturing times of the products are no longer necessary. Furthermore, the products are distinguished in that they do not inhibit the activity of normal optical brighteners conventionally used in paper manufacture.

The products can optionally also be used together with conventional cationic fixing agents and retention agents, preferably with wet-strength agents. In terms of the invention, retention agents are cationic polycondensation products of polyamines, preferably N-methyl-bis(3-aminopropyl)amine, with alkylene dihalides, preferably dichloroethane. Particularly preferred retention agents are those which have no free NH- or —NH$_2$ groups.

When the products to be used according to the invention are employed together with conventional wet-strength agents, it is possible in particular to lower the AOX pollution of the effluent caused by these conventional wet-strength agents. Furthermore, in most cases, the wet-strength effect is synergistically enhanced and the retention of pigments, fillers etc. improved.

The water-dispersible polyisocyanates to be used according to the invention can be employed in a mixture with 0.05 to 50 parts by weight, preferably 0.1 to 10 parts by weight of a retention agent based on a cationic polycondensation product of polyamines and alkylene dihalides, the amount of retention agent being based on the paper stock.

The water-dispersible polyisocyanates to be used according to the invention can be employed in a mixture with 1 to 400 parts by weight, preferably 10 to 100 parts by weight of a polyamidoamine/epichlorohydrin resin, based on the polyisocyanate.

The products which are preferably used as polyamidoamine/epichlorohydrin resins are those prepared by the reaction of (α) polyamines containing at least three amino groups per molecule, and (β) $C_3$–$C_{10}$-dicarboxylic acids, the molar ratio of (α) to (β) being 1:0.8 to 1:1.4, and subsequent reaction of the resulting polyamidoamine (γ) with epichlorohydrin, 1.0 to 1.8 mol of epichlorohydrin being used per mol of basic amino groups in the polyamidoamine (g).

As dicarboxylic acids (β), it is preferable to use saturated aliphatic dibasic carboxylic acids having 3 to 10 C atoms, such as e.g. malonic acid, succinic acid, adipic acid or azelaic acid, or mixtures of these acids.

As polyamines (α), it is possible to use a multitude of polyalkylenepolyamines, including polyethylenepolyamines, polypropylenepolyamines and polybutylenepolyamines. In the polyalkylenepolyamines, the alkylene groups have move than 1 C atom and there are two to eight such groups in the molecule. The nitrogen atoms can be bonded to adjacent carbon atoms in the group $C_nH_{2n}$— or to more remote carbon atoms, but not to the same carbon atom. It is possible not only to use polyamines such as diethylenetriamine, triethylenetetramine, tetraethylenepentamine, dipropylenetriamine and N-bis-(aminopropyl)methylamine on their own, but also to use mixtures of these and their crude products. For example, the mixture of polyethylenepolyamines obtained by reaction of ammonia and ethylene dichloride and purification only to the extent of removing chlorides, water, excess ammonia and ethylenediamine is a very satisfactory starting material. Products prepared from a distillation residue from the refining of the low polyethylenepolyamines, and consisting essentially of polyamines higher than tetraethylenepentamine, can also be used.

Of course, it is also possible to use compounds which contain smaller groups bonded to nitrogen, such as $CH_2CH_2OH$, and which are almost always present to a certain extent in commercially available polyamines as the result of a secondary reaction in the conventional processes by which polyalkylenepolyamines are prepared. Oxyalkyl-substituted polyamines can also be used.

The process for the preparation of these polyamidoamine/epichlorohydrin resins is described in German Auslegeschrift 1 177 824.

Examples A–D describe the preparation of the polyisocyanates and Examples 1–5 describe their use.

EXAMPLES

Polyisocyanate A 0.08 val of a monofunctional polyethylene oxide polyether started on methanol, with an average molecular weight of 350, is added at room temperature, with stirring, to 1.0 val of a polyisocyanate containing isocyanurate groups and based on 1,6-diisocyanatohexane (HDI), with an NCO content of 21.5% and a viscosity of 3000 mPas (23° C.), and the mixture is then heated for 3 h at 100° C. A practically colourless, clear polyisocyanate mixture according to the invention is obtained after cooling to room temperature. The NCO content is 17.3% and the viscosity is 3050 mPas (23° C.).

8 parts of the polyisocyanate obtained in this way are diluted with 2 parts of propylene glycol diacetate to give and 80% solution with an NCO content of 12.6% and a viscosity of 510 mPas.

Polyisocyanate B 0.013 val of a monofunctional polyethylene oxide polyether started on 3-ethyl-3-hydroxymethyloxetane, with an average molecular weight of 1210, is added at room temperature, with stirring, to 1.0 val of the polyisocyanate used for the preparation of polyisocyanate A, containing isocyanurate groups and based on 1,6-diisocyanatohexane, and the mixture is then heated for 2 h at 100° C. A practically colourless, clear polyisocyanate mixture according to the invention is obtained after cooling to room temperature. The NCO content is 19.6% and the viscosity is 2900 mPas (23° C.).

Polyisocyanate C 0.01 val of a monofunctional polyethylene oxide/polypropylene oxide polyether started on n-butanol, with a content of ethylene oxide units of 80% and an average molecular weight of 2150, is added at room temperature to 1.0 val of the polyisocyanate used for the preparation of polyisocyanate A, containing isocyanurate groups and based on 1,6-diisocyanatohexane, and the mixture is then heated for 1 h at 100° C. A pale yellow, clear polyisocyanate mixture with an NCO content of 17.8% and a viscosity of 3360 mPas (23° C.) is obtained after cooling to room temperature.

Polyisocyanate D

A semiprepolymer is prepared at 95° C., over 1.25 hours, from 300 g of a trifunctional EO/PO polyether based on trimethylolpropane, with a molecular weight of 4800 (EO/PO=15/85), 120 g of an EO/PO polyether started on n-butanol, with a molecular weight of 2150 (EO/PO=80/20), and 80 g of isophorone diisocyanate.

The mixture is catalysed with 1 drop of tin octoate, kept at 90° C. for 30 minutes and then dissolved in 125 g of methoxypropyl acetate. The clear solution has an NCO content of 4.0% (based on solids).

66 g of this product are diluted with a further 145 g of methoxypropyl acetate, 107 g of polyisocyanate B are added and the mixture is stirred for 30 minutes at room temperature to give a clear, pale yellow resin solution with an NCO content of 7.4%. The solids content is 50%. The NCO content based on solids is 14.8%.

Example 1

2%, 4% and 8% dispersions of polyisocyanate A (80% active compound in propylene glycol diacetate) in water were prepared as the sizing press liquor and used for treating mechanical paper (containing about 35% of groundwood pulp; 80 g/m$^2$) in a sizing press with 100% liquid uptake.

The breaking strain of the papers obtained (dry and wet) was as follows:

| Sizing press liquor | Active substance concentration [%] | Breaking strain dry [N] | Breaking strain wet [N] |
| --- | --- | --- | --- |
| 0% of polyisocyanate A | 0 | 25.8 | 0.3 |
| 2% of polyisocyanate A | 1.6 | 25.9 | 8.6 |
| 4% of polyisocyanate A | 3.2 | 21.6 | 8.3 |
| 8% of polyisocyanate A | 6.4 | 19.7 | 8.0 |

A Comparative Experiment, using similar amounts of a commercially available wet-strength agent (15% aqueous solution of a polyamidoamine which had been reacted with epichlorohydrin), gave the following contrasting results:

| | Active substance concentration [%] | Breaking strain dry [N] | Breaking strain wet [N] |
| --- | --- | --- | --- |
| 0% of polyamidoamine resin | 0 | 25.8 | 0.3 |
| 2% of polyamidoamine resin | 0.3 | 26.7 | 3.4 |
| 4% of polyamidoamine resin | 0.6 | 29 | 4.6 |
| 8% of polyamidoamine resin | 1.2 | 33.3 | 6.1 |

Thus the softer paper treated with polyisocyanate A, containing 1.6% of active substance (2% of the 80% solution), had a higher wet breaking strain than the paper treated with the commercially available wet-strength agent, containing 1.2% of active substance (8% of the 15% solution). Moreover, neither inorganic nor organically bonded chlorine is released when polyisocyanate A is used.

Example 2

Papers with a basic weight of 80 g/m$^2$ comprising 80% softwood pulp and 20% hardwood pulp were produced without wet-strength agents at a pH of 7 with a degree of beating of 35 °SR. The papers were treated in a laboratory sizing press of type HF made by the Mathis company, Zürich, Switzerland. The liquors employed were solutions or emulsions containing 0.3%, 0.6%, 0.9% and 1.2% of the water-dispersible polyisocyanate A.

The liquid uptake of the paper was 100%. The papers were dried at 85° C. for 8 minutes and then condensed for 10 minutes at 110° C. For comparison purposes a known commercially available polyamidoamine resin was tested at the same time. The wet breaking strain of the paper sheets was tested as described in Example 1.

The results surprisingly show that the paper obtained by the process of the invention had a considerably higher wet strength than when using the commercially available polyamidoamine resin.

| | Wet breaking strain [N] of condensed paper using a content of active compound of: | | | |
| --- | --- | --- | --- | --- |
| Product | 0.3% | 0.6% | 0.9% | 1.2% |
| polyisocyanate A | 13.3 | 15.8 | 17.0 | 17.6 |
| polyamidoamine resin | 7.0 | 9.5 | 11.5 | 13.6 |

Example 3

This example shows the effectiveness of the polyisocyanates according to the invention when applied to the paper stock.

A mixture of 50% bleached birch sulphate pulp and 50% bleached pine sulphate pulp with a consistency of 2.5% was beaten in a hollander to a degree of beating of 30 °Schopper-Riegler. 100 g of the mixture was placed in a beaker and diluted with water to 1000 ml.

The quantities of polyisocyanate A mentioned in the following table (based on the fibre stock) were introduced into the beaker in the form of an aqueous solution.

After a stirring time of 3 minutes, the contents of the beakers were used to produce, on a sheet former (Rapid- Kothen apparatus), sheets of paper weighing approx. 80 m²/g. The sheets of paper were dried at 85° C. for 8 minutes under vacuum at 30 mbar and after-cured in a drying cabinet for a further 10 minutes at 110° C.

After conditioning, five 1.5 cm wide test strips were cut out of each sheet of paper and immersed in distilled water for 5 minutes. The wet strips were then tested immediately for their wet breaking strain in a tensile tester. A commercially available wet-strength agent with a high organic chlorine content was also tested in parallel as a standard.

It was surprisingly found that the paper containing polyisocyanate A according to the invention already had very good wet strength before condensation (drying at 85° C. for 8 minutes). With the commercially available wet-strength agent, the end values were only obtained after condensation (110° C. for 10 minutes). The following results were obtained:

| Product | % active substance | Wet breaking strain [N] | |
|---|---|---|---|
| | | uncondensed | condensed |
| Polyamidoamine resin | 0.075 | 1.4 | 3.6 |
| " | 0.15 | 2.8 | 7.0 |
| " | 0.3 | 4.3 | 10.5 |
| " | 0.45 | 5.4 | 14.3 |
| " | 0.6 | 6.5 | 15.6 |
| " | 0.75 | 7.4 | 16.9 |
| " | 0.9 | 8.6 | 19.6 |
| " | 1.2 | 8.8 | 22.0 |
| Polyisocyanate A | 0.08 | 3.4 | 4.4 |
| " | 0.16 | 5.0 | 6.0 |
| " | 0.32 | 7.4 | 10.1 |
| " | 0.48 | 8.5 | 11.6 |
| " | 0.64 | 9.2 | 12.1 |
| " | 0.8 | 9.4 | 12.7 |
| " | 0.96 | 10.5 | 14.3 |
| " | 1.28 | 11.3 | 14.7 |
| " | 1.6 | 12 | 15 |

This series was repeated with the difference that a mixture of the two products was also tested:

| Product | Wet-strength agent [%] | Active substance [%] | Breaking strain [N] | |
|---|---|---|---|---|
| | | | dry | wet |
| Polyamidoamine resin | 1 | 0.15 | 90.1 | 6.9 |
| " | 2 | 0.3 | 95.1 | 10.5 |
| " | 4 | 0.6 | 100.3 | 16 |
| Polyisocyanate A | 0.5 | 0.4 | 90.4 | 8 |
| " | 1 | 0.8 | 95.2 | 10.6 |
| " | 2 | 1.6 | 96 | 12.8 |
| Mixture of Polyisocyanate A | 0.5 | 0.4 | | |
| Polyamidoamine resin | 1 | 0.15 | 100.8 | 19.5 |

The synergistic effect is apparent here. 0.4% of polyisocyanate A on its own produces a wet breaking strain of 8 N, 0.15% of polyamidoamine resin on its own produces a wet breaking strain of 6.9 N, but a combination of the two agents gives a wet breaking strain of 19.5 N.

Example 4

Example 3 was repeated using isocyanate B:

| Polyisocyanate | Amount of wet-strength agent [%] | Active substance [%] | Wet breaking strain [N] |
|---|---|---|---|
| B | 0.5 | 0.5 | 3.7 |
| B | 1.0 | 1.0 | 6.1 |

Example 5

Paper stocks such as those suitable for the manufacture of papers for lamination (20% of short fibres, 80% of long fibres; 60% of titanium dioxide, based thereon) were treated in a first test pass with a commercially available 15 percent wet-strength agent (polyamidoamine resin), in a second test pass with polyisocyanate A and in a third test pass with a mixture of this polyisocyanate (see Table for percentage added) and in each case 0.5% of a commercially available retention agent X (a polyamine substantially in the form of the quaternised chloride). The results of the wet breaking strain test were as follows:

| Product | Wet-strength agent [%] | Active substance [%] | Wet breaking strain [N] | Ash [%] |
|---|---|---|---|---|
| Polyamidoamine resin | 1 | 0.15 | 2.1 | 20 |
| " | 2 | 0.3 | 3.9 | 22.5 |
| " | 3 | 0.45 | 5.5 | 23.9 |
| " | 4 | 0.6 | 8.1 | 24 |
| " | 5 | 0.75 | 8.5 | 24.8 |
| " | 6 | 0.9 | 11 | 25.3 |
| " | 8 | 1.2 | 13.3 | 25.1 |
| Polyisocyanate A | 0.1 | 0.08 | 2 | 12.1 |
| " | 0.2 | 0.16 | 3.5 | 12.1 |
| " | 0.4 | 0.32 | 5.1 | 11.3 |
| " | 0.8 | 0.64 | 5.8 | 11.6 |
| " | 1.2 | 0.96 | 6.3 | 12.3 |
| " | 2.0 | 1.6 | 7.6 | 12.2 |
| Polyisocyanate A with 0.5% of retention agent X added in each case (corresponding to 0.125% of active substance) | 0.1 | 0.08 | 1.7 | 21.3 |
| | 0.2 | 0.16 | 2.6 | 21.8 |
| | 0.4 | 0.32 | 3.0 | 19.9 |
| | 0.8 | 0.64 | 4.3 | 22.4 |
| | 1.2 | 0.96 | 4.4 | 22.4 |
| | 2.0 | 1.6 | 4.7 | 23.8 |

As can be seen from the Table, the wet breaking strain in the lower operative range, based on active substance, is higher with polyisocyanate A than with the wet-strength agent of the state of the art, but—as evidenced by the ash value—the retention effect is smaller. However, as also shown in the Table, the retention effect can be raised to the desired level by an additional retention agent.

Example 6

This example illustrates the effect of the wet-strength agent on the degree of whiteness of a brightened paper. The test was carried out according to Example 3 while additionally adding 0.5% of a commercially available optical brightener.

| Wet-strength agent | Amount of wet-strength agent [%] | Active substance [%] | Degree of whiteness CIE |
|---|---|---|---|
| Polyisocyanate A | 0 | 0 | 129 |
| " | 0.2 | 0.16 | 125 |
| " | 0.5 | 0.4 | 128 |
| " | 1.0 | 0.8 | 128 |
| " | 2.0 | 1.6 | 129 |
| Polyamidoamine resin | 0 | 0 | 129 |
| " | 2 | 0.3 | 109 |
| " | 4 | 0.6 | 99 |
| " | 6 | 0.9 | 99 |
| " | 8 | 1.2 | 98 |

In contrast to the commercially available polyamidoamine resin wet-strength agent, no drop in the degree of whiteness according to ISO TC 38 (textile) is observed when using polyisocyanate A according to the invention, i.e. no quenching of the brightener takes place.

What is claimed is:

1. A process for imparting dry and wet strength to paper, in which the paper or the pulp used for producing the paper is treated by adding a water-dispersible polyisocyanate, either directly or in the form of an aqueous emulsion, to the pulp or by applying it to the surface of the paper, wherein the water-dispersible polyisocyanate is a water-dispersible mixture of non-ionic polyisocyanates with non-ionic polyisocyanates that are modified by polyethers in each of which the isocyanate groups are cycloaliphatically bonded isocyanate groups, aliphatically bonded isocyanate groups or a combination thereof, the water-dispersible polyisocyanate having a) a mean NCO functionality of 1.8 to 4.2, b) a content of aliphatically bonded-isocyanate-groups, cycloaliphatically-bonded-isocyanate groups or a combination thereof (calculated as NCO, molecular weight=42) of 12.0 to 21.5% by weight, based on the polyisocyanate mixture, and c) a content of ethylene oxide units situated within polyether chains (calculated as $C_2H_4O$, molecular weight=44) of 2 to 20% by weight, based on the polyisocyanate mixture, the polyether chains having a statistical mean of 5 to 70 ethylene oxide units.

2. A process according to claim 1, in which the water-dispersible polyisocyanates are added in amounts of 0.005 to 50% by weight, based on the paper stock.

3. A process according to claim 1, in which the water-dispersible polyisocyanates are added as a mixture with retention or wet-strength agents.

4. A process according to claim 1, wherein said water dispersible mixture of polyisocyanates is applied to the surface of the paper.

* * * * *